Aug. 16, 1938.　　　H. HARDINGE　　　2,126,884
SEDIMENTATION APPARATUS
Filed May 2, 1936　　　5 Sheets-Sheet 3

Fig.4

INVENTOR
HARLOWE HARDINGE
BY
ATTORNEY

Aug. 16, 1938.    H. HARDINGE    2,126,884
SEDIMENTATION APPARATUS
Filed May 2, 1936    5 Sheets-Sheet 4

INVENTOR
HARLOWE HARDINGE
BY
ATTORNEY

Patented Aug. 16, 1938

2,126,884

UNITED STATES PATENT OFFICE 2,126,884

SEDIMENTATION APPARATUS

Harlowe Hardinge, York, Pa., assignor to Hardinge Company, Incorporated, York, Pa., a corporation of New York Application May 2, 1936, Serial No. 77,471

3 Claims. (Cl. 210—55)

This invention relates to sedimentation apparatus of the type of thickeners or clarifiers in which solids suspended in liquids are settled to the bottom of the apparatus by sedimentation, wherein the settled solids in the form of sludge are raked to a central sludge discharge. The rakes are carried by rake arms which are propelled from a rotatable vertical support. More particularly the invention relates to the construction of the support mechanism for the rake arms, so that the rakes can be lifted from the sludge in the bottom of the apparatus when said rakes encounter an obstruction in the sludge.

An object of the invention is to provide an improved sedimentation apparatus in which the sludge discharge rakes are movably suspended from the driving mechanism.

Another object of the invention is to provide an improved means for supporting the sludge discharge rakes from a single bull ring or wheel rotatably mounted in a framework of light construction.

Another object of the invention is to provide an improved sedimentation apparatus in which the sludge discharge rakes are suspended from their rotating mechanism in such a manner that said rakes are automatically raised above the bed of sludge in the apparatus when the rotating mechanism is overloaded.

Another object of the invention is to provide an improved sedimentation apparatus in which the sludge discharge rakes are automatically raised above the bed of sludge in the apparatus, by electrically operated mechanism, when the mechanism for rotating the sludge rakes is overloaded.

Another object of the invention is to provide an improved operating mechanism for sedimentation apparatus having two electric motors operatively associated with each other in such a manner that when one motor becomes overloaded, the other motor actuates mechanism effective to reduce the overload on the first motor.

Another object of the invention is to provide an improved sedimentation apparatus of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In previous practice, sedimentation apparatus of the type of the present invention were usually provided with two bearings, one above and one below the driving mechanism, or both below, so spaced apart that the shaft was held rigid vertically and rotated around a thrust bearing. When it was desired to raise the sludge discharge rakes and their operating mechanism, the shaft was pulled up through the main drive gear along a sliding keyway. The difficulty encountered by such practice was that the pressure against the keyway sometimes became so excessive that it required a great deal of force to raise the mechanism, particularly when the mechanism was loaded, and in order to obtain the proper amount of strength, it was necessary to employ oversize shafts. According to the present invention no shaft is required. In its place I utilize a pipe, tube, or any other suitable member which will withstand torque, etc.

Figure 1:
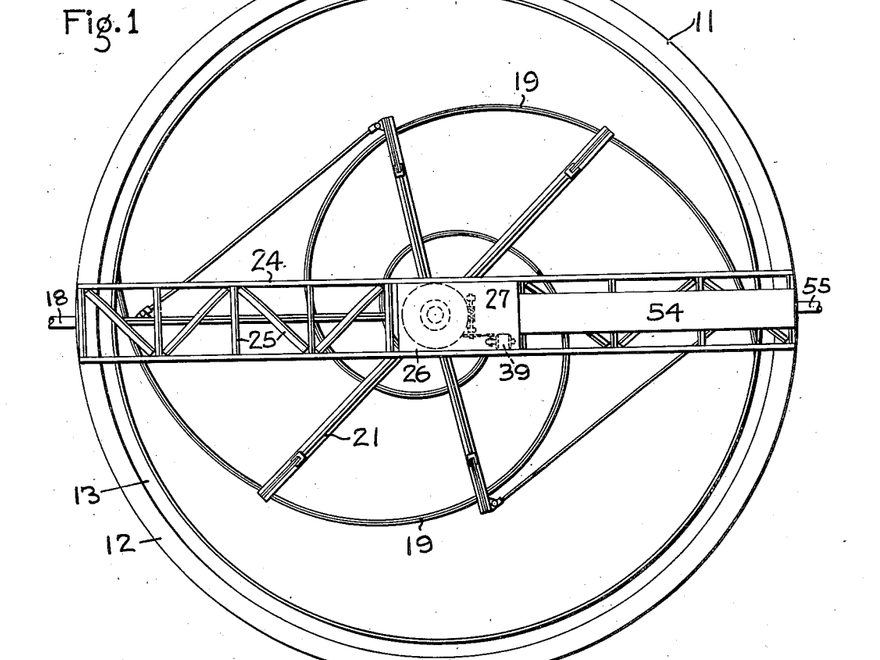
Figure 1 is a plan of a sedimentation apparatus constructed according to the present invention.
Figure 2:
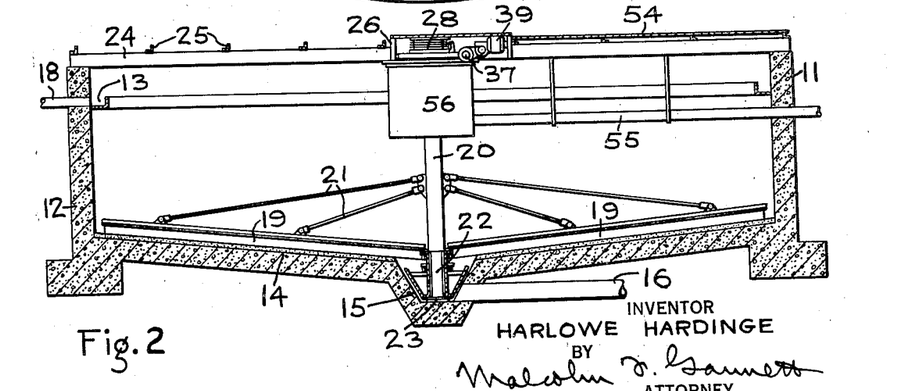
Fig. 2 is a vertical transverse section of the apparatus shown in Fig. 1.

Referring to the drawings and especially to Figs. 1 and 2, the improved sedimentation apparatus may comprise a tank 11 for holding the liquid from which solids in suspension are to be removed. The tank 11 is shown as being circular in form and constructed from concrete or other cementitious material, however, it will be understood that the tank may be constructed from any other suitable material and have any other configuration when so desired.

The tank 11 has a side wall 12 which is formed with an overflow trough 13, and an inclined bottom 14, which slopes downwardly towards the center of the tank.

Solids settling to the bottom 14 by sedimentation take the form of sludge which is raked or impelled toward a bottom discharge hopper 15 from which the sludge is removed through a discharge pipe 16.

An effluent pipe 18 is connected to the trough 13 for the purpose of carrying off the liquid from said trough.

For the purpose of raking or impelling the sludge on the bottom 14 toward the hopper 15, I prefer to use a scraping device comprising a plurality of rakes or plows 19 which are supported from a central vertical rotatable support or torque tube 20. Any convenient form of structure may be utilized for supporting the rakes or plows 19 and this structure may take the form of bracing 21 which connects said rakes or plows 19 with said torque tube 20.

Figure 3:
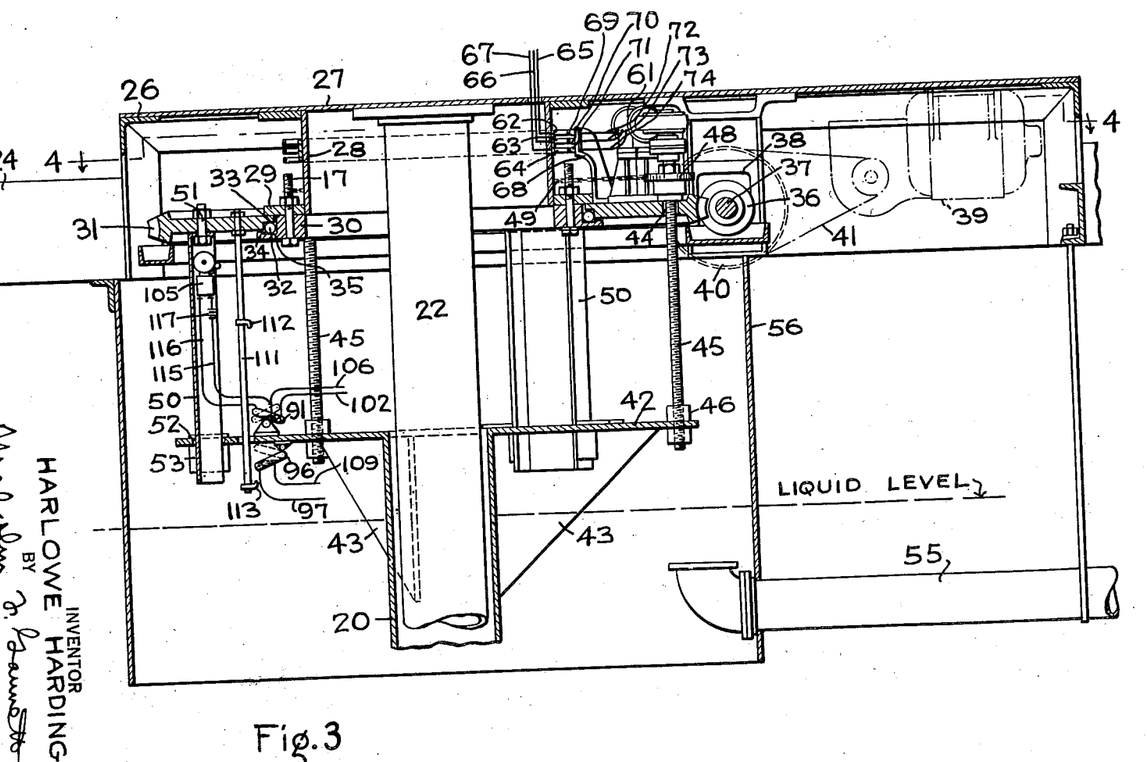
Fig. 3 is an enlarged vertical section of the supporting and rotating mechanism for the sludge discharge rakes.
Figure 4:
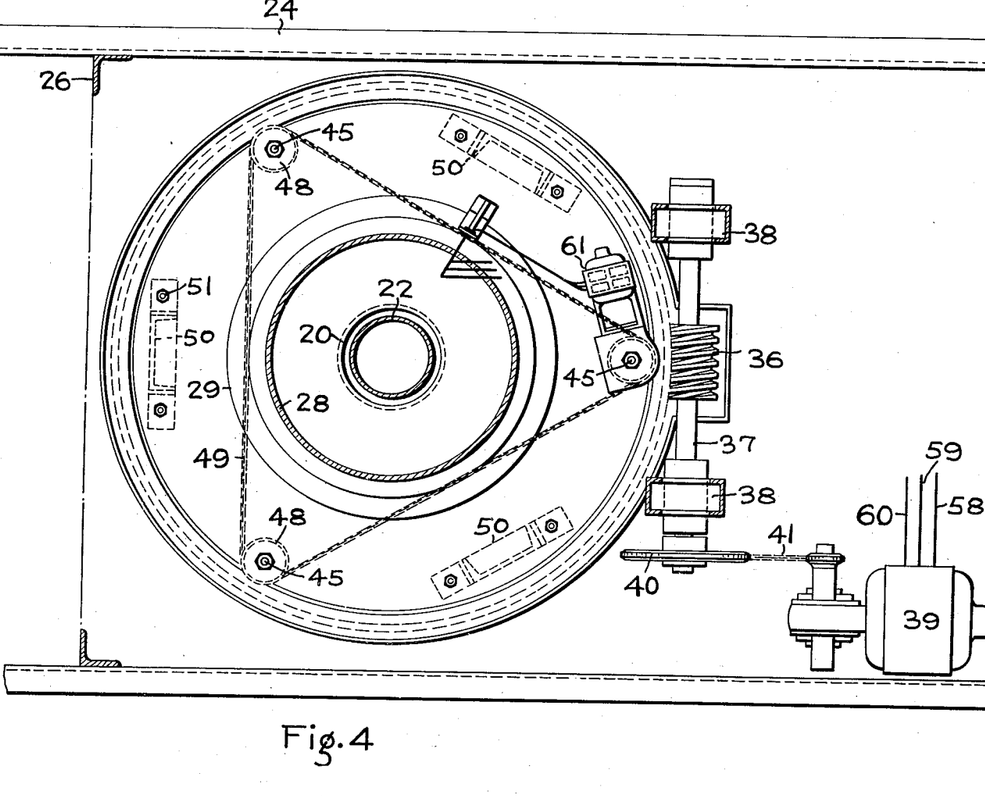
Fig. 4 is a horizontal section taken on the line 4—4 of Fig. 3.

As shown in Figs. 3 and 4, the torque tube 20 surrounds a stationary column 22 located in the center of the tank 11. The torque tube 20 is spaced a suitable distance from the column 22, so as to rotate freely and also permit vertical movement of the scraping device with respect to said column.

Preferably the column 22 is constructed from a suitable length of pipe, the bottom of the column being supported by suitable means, indicated at 23, Fig. 2, secured to the bottom of the tank 11.

The top of the column 22 serves as a support for a framework 24 which extends diametrically across the top of the tank in the form of a bridge.

The framework or bridge 24 is preferably constructed from structural steel and is considerably lighter in weight than the trusses or frameworks heretofore employed with sedimentation apparatus of the type falling within the scope of the present invention.

As shown in Figs. 1, 2, 3 and 4, the framework or bridge 24 may comprise a pair of parallel channels or beams which are spaced apart a suitable distance and which straddle the column 22 and the driving mechanism for the scraping device to be hereinafter described. The channels or beams are reinforced and tied together by suitable bracing 25.

Intermediate the ends of the framework or bridge 24, there is a superstructure 26, also preferably constructed from structural steel. The superstructure 26 is mounted on the central column 22 and also connected to the framework or bridge 24, as shown clearly in Figs. 3 and 4.

The superstructure 26 constitutes a support for the driving means for the scraper device, and said superstructure may include a plate 27 mounted on top of the column 22 and forming a platform that covers the driving mechanism.

Depending from the plate 27 and surrounding the upper portion of the column 22, is a tubular member 28. The tube 28 extends downwardly from the plate 27 a suitable distance and its lower edge has secured thereto an outwardly extending ring which constitutes a flange 29.

Underlying the flange 29 is a large bull ring, in the form of a worm wheel 31, which is driven by suitable mechanism to be hereinafter described.

The worm wheel 31 carries the whole load of the scraping device, as constituted by the rakes 19, torque tube 20, and associated parts, and in order to permit free rotation of the worm wheel 31 and also to transmit the load to the tubular member 28 and superstructure 26, an anti-friction device such as a ball bearing 32 is provided.

In the present instance the bearing 32 is shown as comprising an annular member 30 having an outwardly extending flange 34 formed thereon, said member also having formed thereon an annular groove 35 for the balls of the bearing 32.

The balls of the bearing 32 are disposed between the flange 34 and a flange 33 formed on the inner periphery of the worm wheel 31. The flange 33 underlies the flange 29, and in order to clamp the parts together, the annular member 30 is detachably fixed to the flange 29 by means of a plurality of bolts 17, as shown in Fig. 3.

Since the worm wheel 31 is clamped between members 29 and 30, these members constitute thrust collars for retaining said worm wheel in position should the scraper device and the parts operatively connected thereto have a tendency to tilt.

As shown in Figs. 3 and 4, the worm wheel 31 is in meshing relationship with a worm gear 36 on a horizontally disposed shaft 37, mounted in bearings 38 carried by the superstructure 26.

The driving mechanism includes an electric motor 39 which is mounted on the superstructure 26. The motor 39 is of the well known type of gear motor having speed reducing gears built therein, and said motor is operatively connected to the worm gear 36 by a chain 41 which drives gear 36 through a sprocket 40 on shaft 37. Through the driving connection between motor 39 and worm gear 36, the worm wheel 31 will be driven comparatively slowly so as to effect rotation of the scraping device at the desired rate of speed. In this connection it should be noted that the rakes of sedimentation apparatus of the type falling within the scope of the present invention are adapted to be rotated comparatively slowly, usually requiring from six minutes to thirty minutes for a revolution around the tank 11.

The upper portion of the torque tube 20 is formed with a substantially horizontally disposed plate 42 which may be rigidly secured to said torque tube by means of a plurality of braces 43.

At suitable intervals the worm wheel 31 is formed with openings 44, three such openings being provided in the present instance.

Mounted in each opening 44, is an elongated threaded rod 45 having its lower end mounted in nuts 46 fixed to plate 42, and its upper end extending above the worm wheel 31 a suitable distance.

A sprocket 48 is fixed to the upper end of each rod 45, and an endless chain 49 is mounted on all of the sprockets 48 for a purpose to be hereinafter more fully described.

It will be observed that, due to the manner of suspending the scraping mechanism from the drive element or worm wheel 31, by means of the rods 45, above described, said rods are under tension.

Since a considerable torque is developed when the worm wheel 31 and the scraping mechanism suspended therefrom are rotated, suitable means should be provided for relieving the rods 45 of torque. Therefore, in the present embodiment of the invention I utilize a second series of members 50, which depend from the worm wheel 31, and are operatively connected with the scraping mechanism for the purpose of taking up the torque between the worm wheel 31 and the scraping mechanism.

Each torque member 50 may comprise a bar in the form of a channel or I-beam, a channel being shown in Figs. 3 and 4. The upper ends of the bars 50 are rigidly secured to the worm wheel 31, as indicated at 51, and the lower ends of said bars extend downwardly and pass through suitable openings 52 formed in the plate 42. The openings 52 may be reinforced by shims or plates 53. The openings 52 should preferably be so constructed as to permit free sliding movement of the bars 50 therethrough, so that the scraping mechanism can be raised or lowered, either under a loaded or a no load condition, with a minimum amount of friction between the bars 50 and the edges of the openings 52.

A walkway 54 is mounted on one half of the framework or bridge 24, said walkway extending from the periphery of the tank 11 inwardly to the superstructure 26, as shown in Fig. 1, so as to provide means for enabling an operator to easily reach the mechanism at the center of the tank.

The feed may be brought in by a radial feed launder so that it is fed to the apparatus centrally thereof.

In the present instance the incoming liquid is shown as being conveyed through an influent pipe 55 which underlies the walkway 54 and is supported from the framework or bridge 24, as shown in Figs. 2 and 3.

The inner end of pipe 55 terminates within a relatively large cylindrical baffle 56 which surrounds the upper portion of the torque tube 20 and extends downwardly into the liquid in the tank 11 a suitable distance, as shown in Fig. 3. The bottom of the baffle 56 is open.

The liquid discharged from pipe 55 flows downwardly through the open bottom of the baffle 56 into the main portion of the tank 11.

Since the feed being delivered by the pipe 55 has considerable velocity, by providing the baffle 56 the turbulent liquid flowing out of the end of the pipe 55 will be stilled within said baffle in such a manner that the force of the liquid passing out through the bottom of the baffle 56 will be reduced to such an extent that the quiet or still liquid in the tank 11 will not be agitated or disturbed by the incoming liquid feeding into the tank.

Electric current is supplied to motor 39 by conductors 58, 59 and 60, which lead from a suitable power supply.

Figure 5:
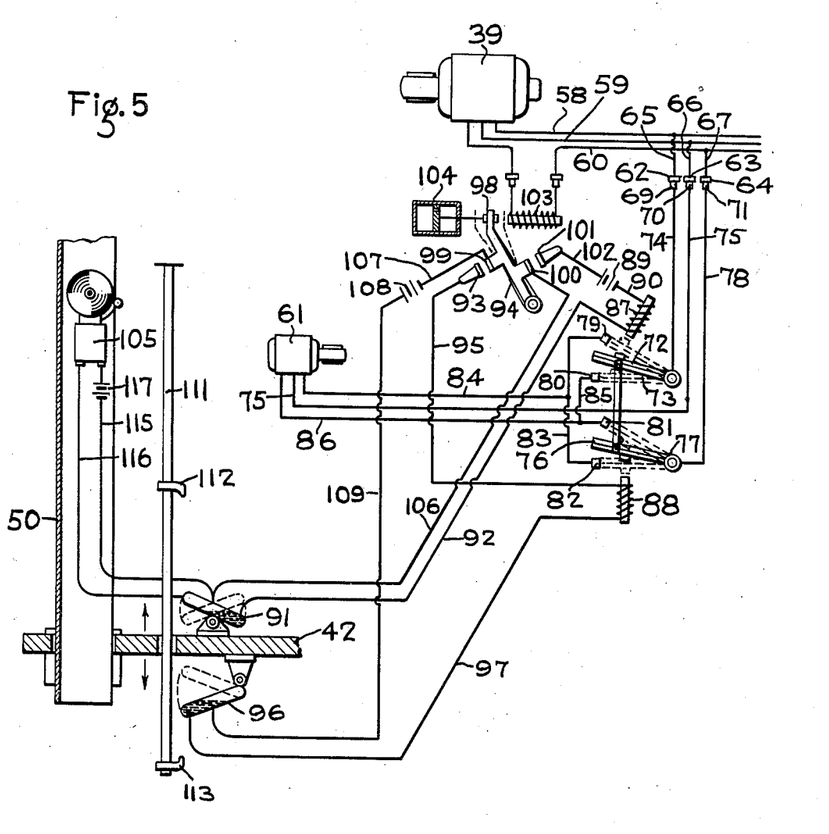
Fig. 5 is a diagrammatic view, partly in section, showing one form of electric circuit for controlling the two motors of the apparatus.

As shown in Figs. 3 and 4, operatively connected to one of the threaded rods 45 is a reversible electric motor 61, which is mounted on the worm wheel 31 and revolves therewith. The operation of motor 61 is, in the instant case, controlled by two methods, one of which is shown in Fig. 5, and the other in Fig. 6.

Motor 61 may be of a well known type of gear motor, having a reduction gear operatively connected to the motor shaft, said reduction gear in turn being operatively connected with rod 45, so that when the motor 61 operates in one direction, all of the rods 45 will be rotated simultaneously through the means of chain 49 to draw the raking mechanism upwardly through the connection of the lower ends of the rods 45 with the tube 20 provided by nuts 46, and when the motor 61 operates in the opposite direction, the raking mechanism will be lowered.

In order to supply electric current to motor 61, the tubular member 28 carries a plurality of collector rings 62, 63 and 64, to which are respectively connected conductors 65, 66 and 67, as shown in Fig. 3. The conductors 65, 66 and 67 are connected to the main supply conductors 58, 59 and 60, respectively, as shown in Fig. 5.

Mounted on a bracket 68 carried by worm wheel 31 is a plurality of brushes or contactors 69, 70 and 71, which engage, respectively, collector rings 62, 63 and 64. The brush 69 is connected to an arm 72 of a switch device 73 by a conductor 74.

The brush 70 is connected to a terminal of motor 61 by a conductor 75.

The brush 71 is connected to an arm 76 of a switch device 77 by a conductor 78.

Figure 6:
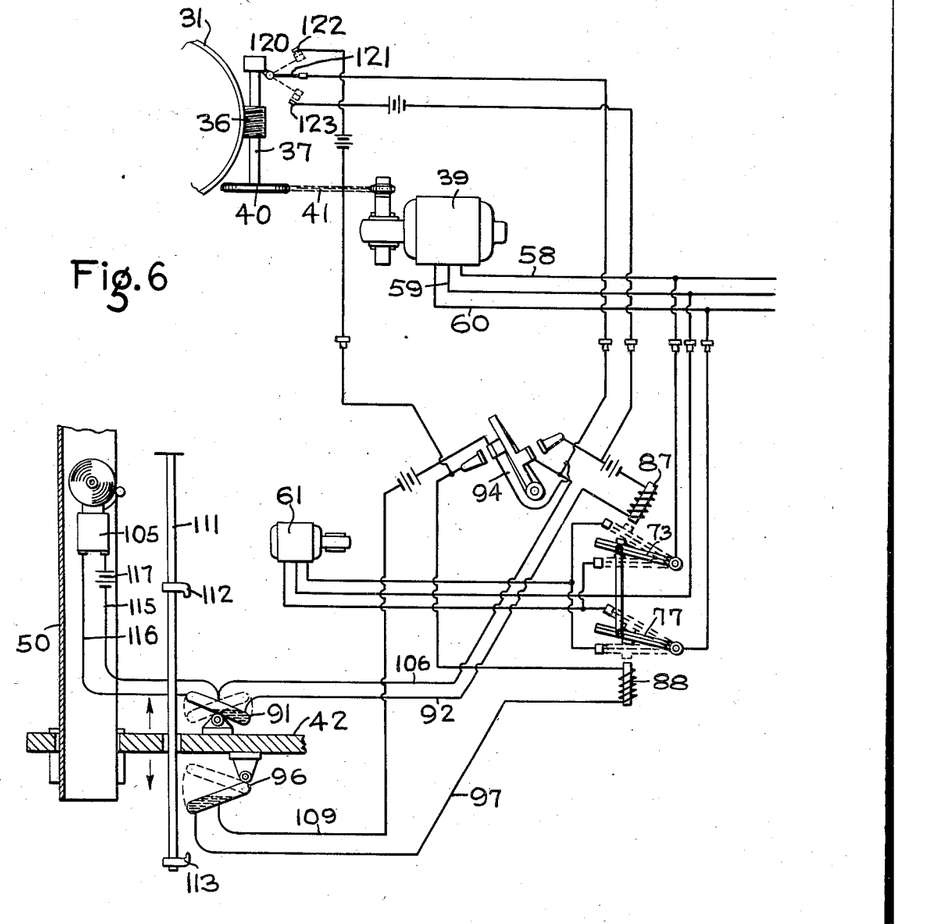
Fig. 6 is a view similar to Fig. 5 of another form of electric circuit.

Arms 72 and 76 of switches 73 and 77, respectively, are connected together, as shown in Figs. 5 and 6, so that movement of one arm effects corresponding movement of the other switch arm, as hereinafter more fully described.

Switch device 73 has two contact points 79 and 80 which are adapted to be engaged by contact arm 72 in a manner to be hereinafter more fully described.

Switch device 77 has two contact points 81 and 82 which are adapted to be engaged by contact arm 76 for a purpose to be hereinafter described.

Contact points 79 and 82 are connected by a conductor 83, and conductor 83 in turn is connected to a terminal of motor 61 by a conductor 84.

Contact points 80 and 81 are connected by a conductor 85, and conductor 85 in turn is connected to a terminal of motor 61 by a conductor 86.

Preferably switches 73 and 77 are magnetically controlled switches, the arm 72 of switch 73 being operated by a solenoid 87, and the arm 76 of switch 77 being operated by a solenoid 88.

A terminal of solenoid 87 is connected to a source of electric current such as a battery 89 by a conductor 90. The other terminal of solenoid 87 is connected to a terminal of a double acting mercury switch device 91, by a conductor 92.

One terminal of solenoid 88 is connected to a terminal 93 of a switch device 94 by a conductor 95. The other terminal of solenoid 88 is connected to a terminal of a single acting mercury switch device 96 by a conductor 97.

The switch device 94 has an arm 98 provided with a contact point 99 adapted to engage terminal 93. Switch arm 98 is also provided with another contact point 100 adapted to engage a terminal 101 connected to battery 89 by a conductor 102.

The arm 98 of switch device 94 is under the control of a solenoid 103, and said switch arm is connected to a dash pot device 104 for a purpose to be hereinafter more fully described.

The solenoid 103 of switch device 94 is connected to main power supply conductor 60 as shown in Fig. 5, so that when there is an increase in current supplied to the main motor 39 above a predetermined amount, solenoid 103 will be energized so that the switch device 94 will be closed.

A signal device 105 may be mounted on one of the torque members or bars 50 depending from the worm wheel 31. In the present instance, the signal device 105 is shown as comprising an electric bell, although it will be understood that any other form of signaling device may be employed if so desired. The bell 105 is electrically connected as shown in Fig. 5, to the double acting switch device 91 by conductors 115 and 116, the latter being connected to a battery 117 for supplying electrical current to bell 105. A terminal of switch device 91 is connected to contact point 100 of switch device 94 by a conductor 106.

The switch arms 72, 76 and 98 of switch devices 73, 77 and 94, respectively, are adapted to be positioned in any one of three positions. During normal operation of the sedimentation apparatus, the switch arms are in a neutral position, as shown in Fig. 5. When, under the influence of solenoid 103, switch arm 94 is moved to the right, contact point 100 engages terminal 101, and the circuit will be closed through which solenoid 87 of switch device 73 is energized. On the other hand, when switch arm 94 is moved from its neutral position to the left, contact point 99 engages terminal 93, thereby closing the circuit through which solenoid 88 of switch device 77 is energized by electric current supplied by battery 108, through conductor 109, single acting mercury switch 96, conductors 97 and 95, contact points 93 and 99, and conductor 107.

Depending from worm wheel 31 is a rod 111 carrying a pair of fingers 112 and 113, finger 112 being positioned to operate the double acting mercury switch 91 when the sludge scraping mechanism is elevated in the manner to be hereinafter more fully described, and finger 113 being positioned to actuate the single acting mercury switch 96.

In operation, the liquid with its solids in suspension to be clarified or thickened by sedimentation, is flowed into the sedimentation tank 11 in a continuous manner and the clarified liquid is flowed therefrom as effluent in a continuous manner. Solids settling out of the liquid fall to the bottom of the tank 11 in the form of sludge and are collected by the rakes or plows 19 which are moved by the central vertical element or torque tube 20, driven from the motor 39 through worm gear 36, worm wheel 37 and the connection between worm wheel 37 and plate 42 of the tube 20 provided by rods 45 and torque members 50. Movement of the rakes or plows 19 over the bottom 14 of the tank 11 causes the settled sludge to be conveyed to the sludge discharge hopper 15, from which the sludge is withdrawn through pipe 16 in any approved manner.

During the operation of the apparatus, as above described, it frequently occurs that the movement of the rakes or plows 19 over the bottom 14 of the tank 11 is resisted, due to several conditions, such as when the settled sludge becomes too heavy for the rakes or there are obstructions of some kind in the tank, or, after a period of idleness, the solids settle down and compact to such extent as to prevent ready movement of the rakes. Therefore, when the movement of the rakes or plows is resisted, in order to prevent damage, bending or breakage thereof, the rakes should be raised up above the point of resistance. Accordingly, when such conditions occur the rakes can be readily raised upwardly above the obstruction in the following manner.

It has been described that the lower ends of the threaded rods 45 are mounted in nuts 46 carried by the plate 42. Since the rods 45 are carried by the worm wheel 31 they are carried around with said worm wheel as it slowly rotates.

When the resistance against the rakes or plows 19 becomes too high, the scraping mechanism will tend to stop rotating. This action causes an overload of the main drive motor 39. Consequently, an increase in electric current will be supplied to motor 39 and such increase in electric current passing through conductor 60 increases the current passing through solenoid 103, and thus the solenoid 103 is operated. Switch arm 98 will then be moved over to the right so that contact point 100 engages terminal 101. This action closes the circuit of solenoid 87 of switch device 73, through conductor 102, battery 89, conductor 90, solenoid 87, conductor 92, double acting mercury switch 91 and conductor 106.

The energization of solenoid 87 is effective to move switch arm 72 of switch device 73 into engagement with contact point 79 and switch arm 76 into engagement with contact point 81.

The circuit through which motor 61 is supplied with electric current from the main power line is thus closed, through conductor 65, collector ring 62, brush 69, conductor 74, switch arm 72, conductors 83 and 84, the motor 61, conductor 75, brush 70, collector ring 63 and conductor 66, and since motor 61 is preferably a polyphase motor, electric current will also flow from conductor 60, through conductor 67, collector ring 64, brush 71, conductor 78, switch arm 76, and conductor 86 to motor 61. The motor 61 will thus be operated in one direction.

Since motor 61 is operatively connected to one of the threaded rods 45 and all of said threaded rods are operatively connected by chain 49, when the motor 61 is thus operated, the turning of one of the rods 45 will be transmitted simultaneously to all of the rods 45 by said chain, and consequently all of the rods will be rotated simultaneously.

Rotation of the rods 45 is effective to cause the plate 42 and the sludge scraping mechanism suspended therefrom to move upwardly thereby lifting the rakes or plows a suitable distance above the obstruction or impedance.

The upward movement of the scraping mechanism also carries the mercury switches 91 and 96 upwardly, since said switches are mounted on the plate 42.

The finger 112 is positioned on rod 111 at the point at which it is desired to limit the upward movement of the scraping mechanism. Consequently, during the upward movement of the scraping mechanism, when the double acting switch 91 engages finger 112, said switch will be operated to break the circuit in which current is supplied to solenoid 87. This action causes solenoid 87 to be deenergized and consequently switch arm 72 moves away from contact point 79 thereby breaking the circuit through which electric current is supplied to motor 61. In this way the motor 61 ceases to operate, and when such action takes place, the upward movement of the sludge scraping mechanism is arrested and the sludge scraping mechanism remains in elevated position, in which the rakes or plows 19 are disposed above the sludge in the bottom of the tank 11.

However, during the period in which solenoid 87 is energized through the closing of switch 94 on account of an increase in current passing through solenoid 103 on its way to motor 39, if the overload of motor 39 should be reduced while the sludge scraping mechanism is being lifted upwardly through the action of motor 61 and before mercury switch 91 has engaged finger 112 and thereby opened the circuit of solenoid 87 in the manner heretofore described, should the resistance or overload of motor 39 decrease an appreciable amount, solenoid 103 will obviously be partially deenergized and consequently switch device 94 will be actuated to open the circuit by which solenoid 87 is energized so that motor 61 will cease operating in an intermediate position of the sludge scraping mechanism.

The purpose of the dash pot 104 is to prevent constant fluctuation of switch 94, since said dash pot is adapted to dampen the movement of switch arm 98 and delay actuation thereof, so that there will not be a constant movement back and forth of switch arm 98 to cause constant reversal of electric current supplied for operating motor 61, except as predetermined and allowed through the dampening effect of the dash pot 104. It will be understood that any other suitable device may be employed in lieu of the dash pot 104 for accomplishing this same result.

When the load on the main drive motor 39 is further reduced, switch arm 98 will move into the position in which contact point 99 engages terminal 93. In this way solenoid 88 will be energized by battery 108, through its circuit connection with single acting mercury switch 96. Energization of solenoid 88 will cause switch arm 76 to move into engagement with contact point 82 and switch arm 72 to move into engagement with contact point 80, thereby closing the circuit in which motor 61 is reversed. With the operation of motor 61 reversed, the rods 45 will be rotated in the opposite direction to which they were turned for raising the sludge scraping mechanism and consequently said sludge scraping mechanism will be lowered.

The lowering movement of the sludge scraping mechanism continues until the resistance on the main drive motor 39 is again increased and the switch arm 98 either is moved to its neutral position or to the position in which contact point 100 engages terminal 101. Should the latter actuation of switch arm 98 occur, motor 61 will be reversed and thereby be effective to raise the sludge scraping mechanism.

However, if the load is normal when the sludge scraping mechanism is lowered to the bottom position, single acting mercury switch 96 will be engaged by finger 113 and tilted upwardly thereby opening the circuit through which electric current is supplied from battery 108 to solenoid 88. With solenoid 88 thus deenergized, switch arm 76 will move upwardly to the neutral position shown in Fig. 5, thereby opening the circuit through which current is supplied to motor 61.

In this way when the sludge scraping mechanism is being lowered towards the bottom of the tank 11, the downward movement of said mechanism will be arrested at the lowermost point desired. The sludge scraping mechanism will remain in its lowermost position until the main drive motor 39 is again overloaded and the operation repeated in the above described manner.

In lieu of using the switch device 94 and associated parts as hereinbefore described, another form of overload control may be employed.

As shown in Fig. 6 the alternative overload control may comprise a switch device 120 operatively associated with the shaft 37 of worm gear 36. When the pressure on the worm gear becomes high as the load increases, the arm 121 of switch device 120 is moved into engagement with overload contact point 122, thereby closing the electric circuit through which solenoid 87 is energized. The operation heretofore described in connection with the form of the invention illustrated in Fig. 5, is then repeated.

When the normal load is reached, switch arm 121 returns to the full line position shown in Fig. 6, thereby opening the electric circuit of solenoid 87 and consequently motor 61 ceases to operate.

When the load on the rakes 19 is subnormal, arm 121 is moved into engagement with contact point 123, thereby closing the electric circuit through which solenoid 88 is energized.

With solenoid 88 thus energized the motor 61 is reversed in the manner heretofore described, with the result that the sludge scraping mechanism is lowered until mercury switch 96 is tilted upwardly by finger 113. This action opens the electric circuit of motor 61 as has been heretofore described, since switch arm 76 returns to the neutral position shown in Fig. 6, when solenoid 88 is deenergized.

Changes may be made in the details of construction and in the arrangement of the parts above described within certain limits without departing from the spirit of the invention.

Having thus described my invention, what I claim is:—

1. A sedimentation apparatus comprising a tank, sludge scraping mechanism within said tank including a supporting means and rakes supported therefrom for scraping solids on the bottom of the tank, a drive element for said sludge scraping mechanism, means supported from said drive element for bodily raising said sludge scraping mechanism above the bottom of said tank, an electric motor for operating said drive element, a second electric motor for operating said sludge scraping mechanism raising means, an electric circuit for supplying electric current to said drive element motor from a source of power supply, an electric circuit normally disconnected from the circuit of the drive element motor for supplying electric current to said second electric motor from the source of current supply, electrically operated switch means for connecting the electric circuit of said second motor with the electric circuit from the source of current supply, and means operable by an overload condition of said drive element motor for operating said switch means to close the circuit to said second motor.

2. A sedimentation apparatus comprising a tank, sludge scraping mechanism within said tank including a supporting member and rakes supported therefrom for scraping solids on the bottom of the tank, a drive element for said sludge scraping mechanism, means supported from said drive element for bodily moving said sludge scraping mechanism away from and towards the bottom of the tank, an electric motor for operating said drive element, a second electric motor for operating said sludge scraping mechanism moving means, an electric circuit for supplying electric current to said drive element motor from a source of power supply, an electric circuit normally disconnected from a source of power supply for supplying electric current to said second electric motor, and electrically operable switch means inactive under normal load conditions of said drive element motor and operable by an overload condition of a predetermined amount of said drive element motor for connecting the electric circuit of said second motor with the electric circuit of said drive element motor.

3. A sedimentation apparatus comprising a tank, sludge scraping mechanism in said tank for scraping solids on the bottom of the tank, a drive element for said sludge scraping mechanism, an electric motor for operating said drive element, means supported from said drive element for bodily moving said sludge scraping mechanism upwardly and downwardly in a straight line in said tank, a second electric motor for operating said sludge scraping mechanism moving means, an electric circuit for supplying electric current to said drive element motor from a source of power supply, an electric circuit normally disconnected from a source of power supply for supplying electric current to said second motor, electrically operable switch means operable by an overload condition of a predetermined amount of said drive element motor for connecting the electric circuit of said second motor with the source of power supply so that the second motor will operate the sludge scraping mechanism moving means to raise the sludge scraping mechanism and thereby relieve the overload condition of the first motor, electric switch means for controlling the electric circuit of said second motor to effect reversal in the direction of operation of the second motor, and another electric switch means operable by the sludge scraping mechanism when said mechanism has moved upwardly or downwardly a predetermined distance for controlling the electric circuit of said second motor so that the second motor is rendered inoperative to effect continued vertical movement of the sludge scraping mechanism.

HARLOWE HARDINGE.